March 3, 1942.  L. A. MEKLER  2,275,184
REACTIVATION OF CONTACT MASSES
Filed April 6, 1940
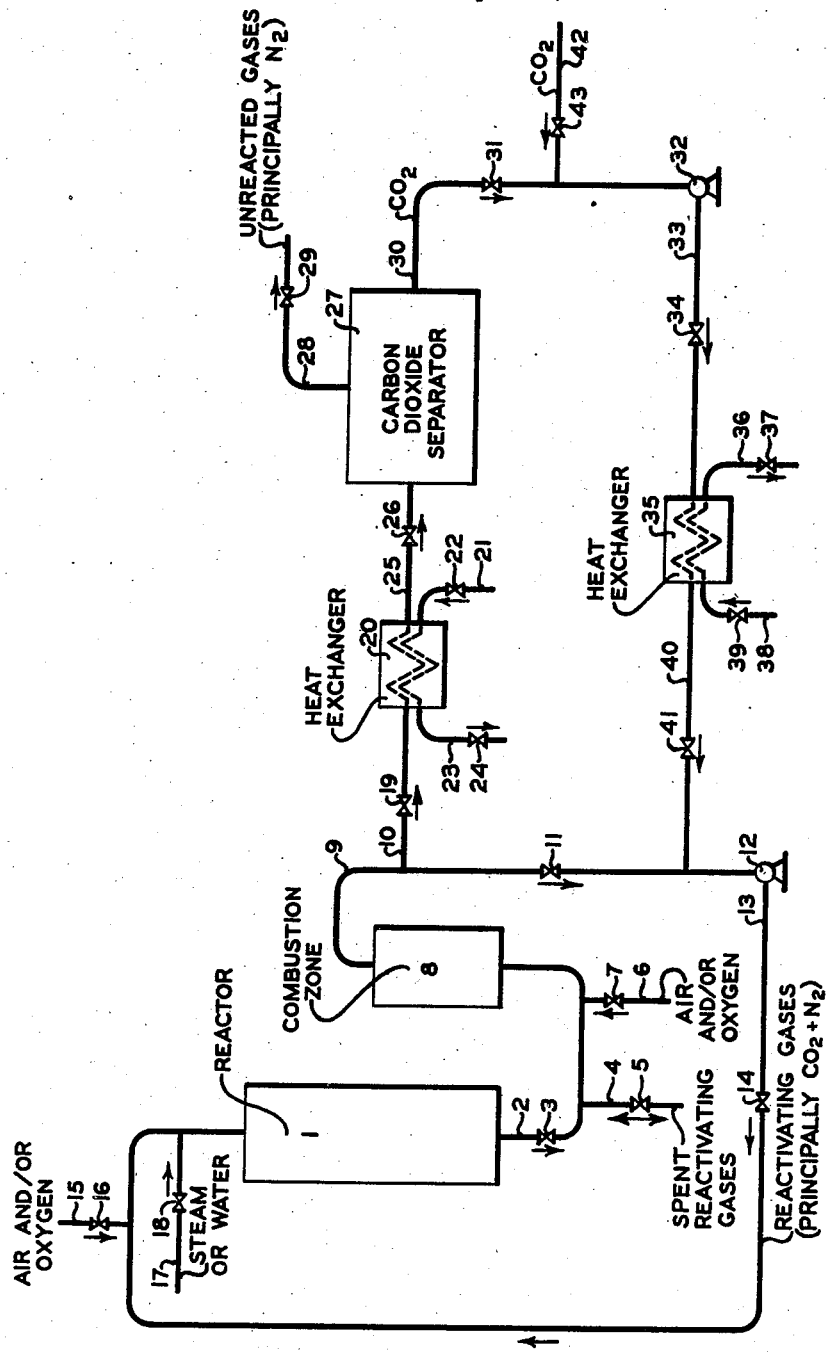
INVENTOR
LEV A. MEKLER
BY Lee J. Cari
ATTORNEY Patented Mar. 3, 1942

2,275,184

UNITED STATES PATENT OFFICE 2,275,184

REACTIVATION OF CONTACT MASSES

Lev A. Mekler, Chicago, Ill., assignor to Universal Oil Products Company, Chicago, Ill., a corporation of Illinois Application April 6, 1940, Serial No. 328,206

6 Claims. (Cl. 252—242)

The invention relates specifically to an improvement in processes for the conversion of hydrocarbons of the type in which the conversion reaction takes place in the presence of a mass of contact material, such as a catalyst capable of promoting said conversion, and in which deleterious carbonaceous materials deposited on the contact material are periodically burned therefrom in a stream of oxygen-containing gases to reactivate the contact mass.

It is common practice in processes of the character above mentioned to employ a relatively dilute mixture of air or oxygen in non-oxidizing gases, such as combustion gases, for example, as the reactivating gas stream and to recycle the mixture for further use after readjusting its temperature to the desired value and renewing its free oxygen content. In such operations, the principal reaction taking place during the combustion of the carbonaceous material is that of carbon to carbon dioxide in the contact mass, although carbon monoxide is also produced. The second reaction (i. e., that in which the carbonaceous material is converted to carbon monoxide) is more desirable than the first reaction, since it liberates less than one-third the heat liberated by the conversion of carbonaceous material to carbon dioxide. Since excessive heating of the contact mass may result in its destruction or permanent impairment of its activity, provisions for reducing the amount of carbon dioxide formed and increasing the amount of carbon monoxide formed may minimize such danger.

I have found that if a relatively high carbon dioxide concentration is maintained in the reactivating gases that the reaction of combustion of the carbonaceous material on the contact mass will tend toward the formation of carbon monoxide rather than carbon dioxide which is the case when the original carbon dioxide concentration is correspondingly low, i. e., 10 to 15% by volume of the reactivating gases. I have also found that if appreciable amounts of carbon monoxide (i. e. above about 2%), are present in the reactivating gases, the benefits of higher carbon dioxide concentration in these gases are partially nullified so that the combustion reaction proceeds in the direction of carbon dioxide with the resultant higher heat liberation and higher reactivating peak temperatures for the same amount of carbon burned. In addition to maintaining a high carbon dioxide concentration, and in addition to introducing the usual amounts of air or oxygen, the invention also provides for the introduction of steam or water to the reactivating gas stream to further favor the formation of carbon monoxide instead of carbon dioxide.

The enrichment of the reactivating gases with carbon dioxide will not only reduce the temperature increase of these gases resulting from the combustion of carbonaceous material but will assist in reducing the temperature rise in the contact mass where the carbonaceous materials are being burned because carbon dioxide has a higher specific heat in the temperature range employed than the nitrogen which it replaces in the reactivating gases whereby a larger proportion of the heat generated is carried away as sensible heat in the reactivating gases.

The accompanying drawing, which is essentially a flow diagram, illustrates one specific method for accomplishing the objects of the invention but is not to be construed as a limiting feature, for various other methods well known in the art may be employed for the same purpose.

Referring to the drawing, a reactor of any desired form and containing a mass of contact material, not illustrated, which is to be reactivated is indicated as 1. The oxygen-containing gas stream is supplied to reactor 1 in the manner to be described at the temperature required to initiate combustion of carbonaceous material deposited on the contact mass. The resulting reactivating gases and combustion products, the latter including quantities of carbon monoxide, are discharged from the reactor through line 2 and directed through valve 3 after which a portion may be removed from the system by way of line 4 and valve 5. Preferably, however, since means are provided for removing excess spent reactivating gases in a subsequent step of the process after available heat has been removed from the spent reactivating gases, the above step will not ordinarily be employed. The spent reactivating gases in line 2 are preferably commingled with additional air and/or oxygen introduced by way of line 6 and valve 7 and the resulting mixture introduced to combustion zone 8 wherein substantially all of the carbon monoxide in the gases is converted to carbon dioxide by combustion with a portion of the oxygen introduced as above described. Extraneous heat may be applied in this zone to maintain it at a temperature sufficient to obtain substantially complete oxidation of the carbon monoxide to carbon dioxide or a catalyst can be used for the promotion of this oxidation at the temperature of the reactivating gases leaving the reactor.

Preferably the air supplied to the system by way of line 6 and valve 7 is supplied in quantities in excess of that required to convert the carbon monoxide to carbon dioxide in zone 8 leaving a quantity of air in the hot combustion gases discharged from zone 8 which may be used along with other air and/or oxygen introduced as hereinafter explained in effecting combustion of the carbonaceous material in reactor 1.

The hot combustion gases from zone 8 are directed through line 9 and a portion withdrawn through line 10 for treatment as hereinafter described, while the residual portion is directed through valve 11 and commingled with carbon dioxide introduced as hereinafter described after which the mixture is supplied to compressor 12. Compressor 12 discharges through line 13 and valve 14 after which the oxygen concentration of the reactivating gases in line 13 may be increased by the addition of air and/or oxygen introduced by way of line 15 and valve 16 and, when desired, steam or water introduced by way of line 17 and valve 18 may be commingled with the mixture and the resulting mixture supplied to reactor 1 as the reactivating gas stream. When the temperature of the reactivating gas stream in line 13 is above that most suitable for effecting combustion in reactor 1, a suitable heat exchanger, not illustrated, may be interposed in line 13 for accomplishing this object.

At the start of the operation, that is, after a shutdown, for example, fresh gases for use in the process may be supplied to the system by way of line 4 and valve 5 after which they are passed through combustion zone 8 and recycled in the manner previously described.

In order to prevent a constant increasing concentration of nitrogen in the system, due to the recycling of the reactivating gases, the portion withdrawn by way of line 10 is directed through valve 19 into heat exchanger 20 wherein indirect heat exchange is effected between the spent reactivating gases and some suitable cooling medium introduced by way of line 21 and valve 22 and withdrawn from heat exchanger 20 by way of line 23 and valve 24. When desired, the cooling medium supplied to heat exchanger 20 may comprise the carbon dioxide separated in the manner to be described later, which is returned to the reactivating gas cycle, and since the means for accomplishing this are well known, such means are not illustrated.

The cooled gases leaving heat exchanger 20 are directed through line 25 and valve 26 into carbon dioxide separator 27. Carbon dioxide separator 27 may be of any suitable design wherein provisions are made for recovering a major portion of the carbon dioxide present in the gases supplied to this zone. Treatment in separator 27 may comprise, for example, a system wherein the gases supplied thereto are passed in contact with a sodium carbonate solution to form a sodium acid carbonate solution which is subsequently heated to drive off the carbon dioxide absorbed and the sodium carbonate recovered and returned for further treatment. Other methods well known in the art for removing carbon dioxide from a mixture of gases containing the same may also be employed within the broad scope of the invention.

Unreacted gases consisting principally of nitrogen and, in some cases, oxygen are removed from separator 27 by way of line 28 and valve 29 and may be recovered or disposed of in any suitable manner. The carbon dioxide separated in separator 27 is removed therefrom by way of line 30 and is directed through valve 31 to compressor 32. Compressor 32 discharges through line 33 and valve 34 into heat exchanger 35 wherein the carbon dioxide may be heated by indirect heat exchange with a suitable heating medium introduced by way of line 36 and valve 37 and withdrawn by way of line 38 and valve 39. When desired, the heating medium may comprise the portion of the gases withdrawn from the reactivating gas cycle by way of line 10 and, in such cases, instead of using two heat exchangers 20 and 35 one heat exchanger will be sufficient to accomplish the desired result. Carbon dioxide leaving heat exchanger 35, at the desired temperature, is directed through line 40 and valve 41 into line 9 for use as above described. When desired, additional carbon dioxide may be supplied to the system at the start of the process, for example, by way of line 42 and valve 43 thereafter being supplied to compressor 32 by way of line 30, the flow thereafter being substantially as described.

It is, of course, within the scope of the invention to operate carbon dioxide separator 27 under conditions regulated to effect only the desired amount of absorption of carbon dioxide, while the residual portion of the carbon dioxide which is in excess of the amount required in the system may be withdrawn from the separator 27 along with the nitrogen and oxygen removed as above described. This operation is particularly applicable when the only point of withdrawal of reactivating gases from the reactivating gas cycle is by way of line 10; however, as above mentioned, other means such as line 4 and valve 5 may be used for withdrawing a portion of the spent reactivating gases from the reactivating gas cycle.

In the operation of the process, best results are obtained when maintaining the carbon dioxide concentration in the reactivating gases above 25% by volume. When the reactivation is accomplished at relatively low temperatures, such as, for example, between 900 and 1200° F., relatively high carbon dioxide concentrations are necessary, whereas at the higher temperatures above 1200° F. lower carbon dioxide concentrations may be used.

When desired, the invention may also be used in a system wherein no carbon monoxide eliminator is employed and more particularly in a system wherein combustion products and spent reactivating gases leaving the reaction zone contain a high proportion of carbon dioxide as compared to carbon monoxide. In such cases, by replacing the nitrogen in the exhaust gases with carbon dioxide, a reactivating gas of high heat capacity is obtained by means of which reactivation at lower temperatures may be accomplished, since the larger proportion of the heat is withdrawn from the spent reactivating gases and combustion products as sensible heat.

I claim as my invention:

1. A process for regenerating carbonized contact material which comprises contacting said material with an oxygen-containing reactivating gas and burning carbonaceous matter from said material in a regenerating zone under conditions conducive to the formation of carbon monoxide, subjecting resultant combustion products to oxidation in a second zone to convert carbon monoxide to carbon dioxide, removing the oxidized gas from said second zone and concentrating its carbon dioxide content by eliminating therefrom a substantial portion, at least, of its other components, and supplying the thus concentrated gas, together with free oxygen, to the regenerating zone as a reactivating medium therein.

2. The process as defined in claim 1 further characterized in that said free oxygen is supplied by oxidizing said combustion products in an excess of oxygen in said second zone.

3. A process for regenerating carbonized contact material which comprises contacting said material with an oxygen-containing reactivating gas and burning carbonaceous matter from said material in a regenerating zone under conditions conducive to the formation of carbon monoxide, subjecting resultant combustion products to oxidation in a second zone to convert carbon monoxide to carbon dioxide, removing the oxidized gas from said second zone and subjecting a portion thereof to a carbon dioxide separating treatment, commingling the separated carbon dioxide with another portion of said oxidized gas, and supplying the resultant mixture, together with free oxygen, to the regenerating zone as a reactivating medium therein.

4. A process for regenerating carbonized contact material which comprises contacting said material with an oxygen-containing reactivating gas and burning carbonaceous matter from said material in a regenerating zone under conditions conducive to the formation of carbon monoxide, subjecting resultant combustion products to oxidation in a second zone to convert carbon monoxide to carbon dioxide, continuously recirculating a portion of the oxidized gas from the second zone to the regenerating zone, separating carbon dioxide from another portion of said oxidized gas, and commingling the separated carbon dioxide and free oxygen with the recirculating portion of the oxidized gas.

5. The process as defined in claim 4 further characterized in that said free oxygen is supplied by oxidizing said combustion products in an excess of oxygen in said second zone.

6. A process for reactivating a mass of contact material having deposited thereon deleterious carbonaceous materials, which comprises passing a stream of reactivating gases containing regulated minor amounts of oxygen in contact with said mass and burning combustible material therefrom under conditions conducive to the formation of carbon monoxide, commingling resulting spent reactivating gases and combustion products with air and burning the mixture in a zone external to said mass to convert the carbon monoxide to carbon dioxide, treating a portion of the resulting products to separate carbon dioxide from nitrogen and other gases, exhausting said nitrogen and other gases, commingling said carbon dioxide with the residual portion of said resulting products to increase the concentration of carbon dioxide in the mixture, adding air to said mixture to replenish the oxygen, and returning the resulting mixture as the reactivating gas to said contact mass.

LEV A. MEKLER.

CERTIFICATE OF CORRECTION.

Patent No. 2,275,184. March 3, 1942.

LEV A. MEKLER.

It is hereby certified that the State of incorporation of the assignee in the above numbered patent was erroneously described and specified as "Illinois" whereas said State should have been described and specified as --Delaware--, as shown by the record of assignments in this office; and that the said Letters Patent should be read with this correction therein that the same may conform to the record of the case in the Patent Office.

Signed and sealed this 21st day of April, A. D. 1942.

(Seal)

Henry Van Arsdale,
Acting Commissioner of Patents.